UNITED STATES PATENT OFFICE.

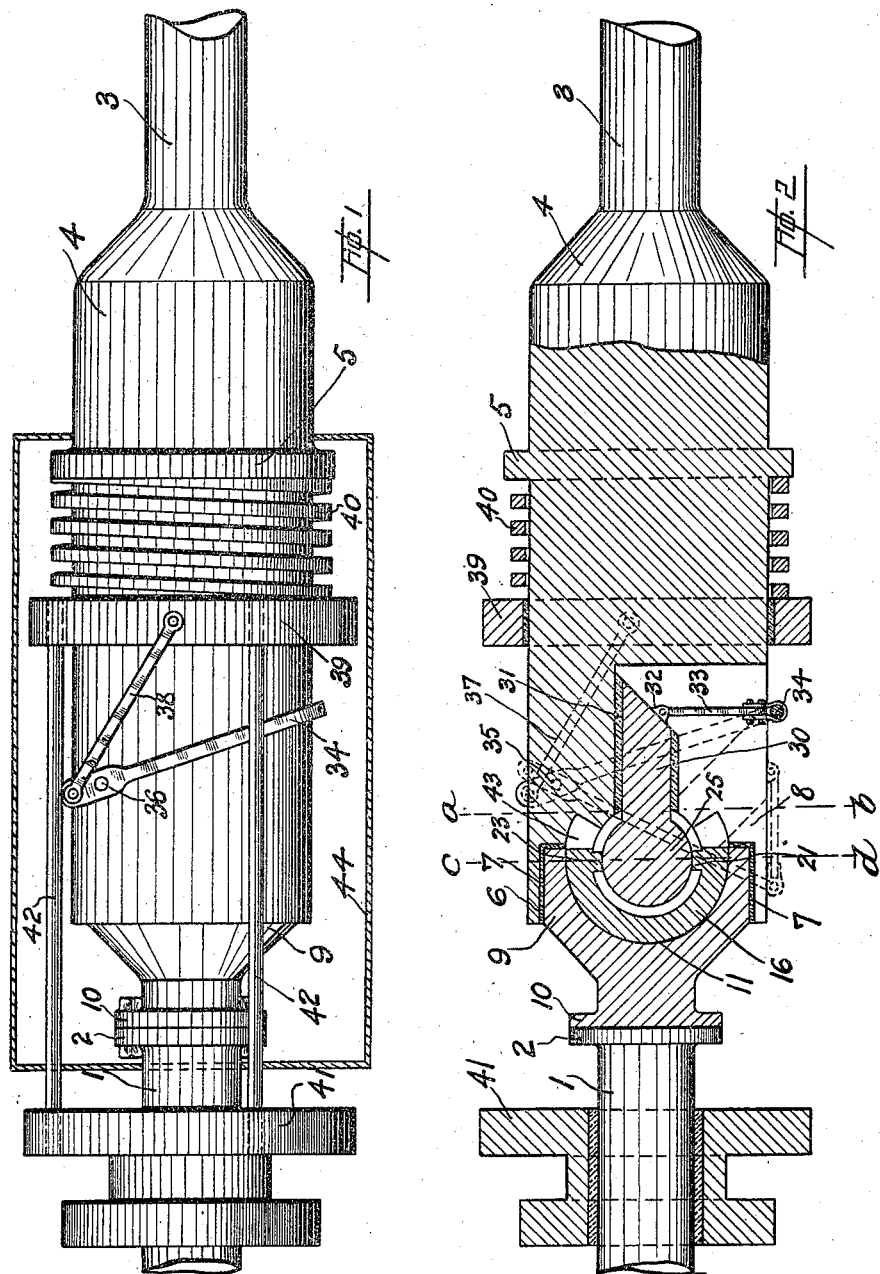

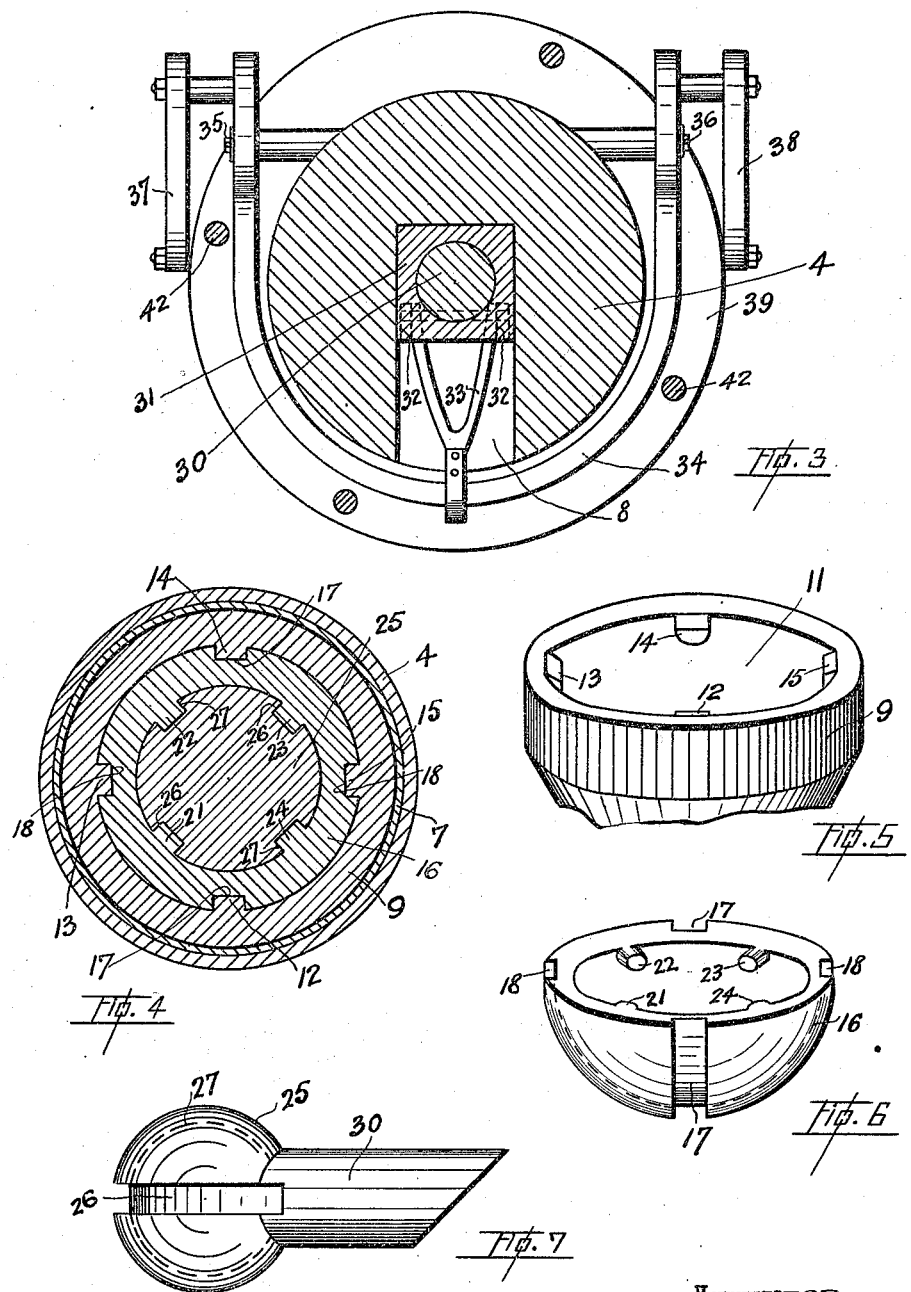

FRANCIS LEE RANDALL, OF NANAIMO, BRITISH COLUMBIA, CANADA.

TRANSMISSION MECHANISM.

1,298,785.  Specification of Letters Patent.  Patented Apr. 1, 1919.

Application filed February 8, 1918. Serial No. 216,099.

*To all whom it may concern:*

Be it known that I, FRANCIS LEE RANDALL, a subject of the King of Great Britain, and a resident of the city of Nanaimo, in the Province of British Columbia, Canada, have invented certain new and useful Improvements in Transmission Mechanism, of which the following is a specification.

My invention relates to improvements in transmission mechanism, and the object of my invention is to devise an efficient mechanism for transmitting motion from one shaft to another, such as in the drive of an automobile, and in which friction is practically eliminated, thereby reducing the wear and tear to the minimum and eliminating the necessity of frequent adjustment such as is required in friction and the like clutches in use at the present time.

I attain this object by the construction illustrated in the accompanying drawings in which Figure 1 is an outside view of the transmission mechanism.

Fig. 2 is a longitudinal sectional elevation, taken on the center line of Fig. 1.

Fig. 3 is a cross section taken on the line *a—b* of Fig. 2.

Fig. 4 is a cross section taken on the line *c—d* of Fig. 2.

Fig. 5 is a detail view of the cup shaped coupling member, partly broken away.

Fig. 6 is a detail view of the inner cup.

Fig. 7 is a detail view of the ball and center pin.

Similar figures of reference indicate similar parts throughout the several views.

1 indicates a driving shaft provided with a half-coupling 2, while 3 indicates the driven shaft, the end of which is enlarged as at 4 in Figs. 1 and 2, the enlargement being provided with a flange or fixed collar 5. The end of the enlargement 4 is counterbored, as at 6, in which counterbore is fitted a liner 7, of any suitable material, such as brass, and on one side of the enlargement is an inwardly extending slot 8, as shown in Figs. 2 and 3.

Rotatably fitted in the bore 6 is a coupling member 9, which member is extended and provided with a half-coupling 10 by means of which the member 9 may be bolt-connected to the half-coupling 2 of the driving shaft 1, and the inner end of the member 9 is formed as a concentric cup 11, on the inside of which cup adjacent its mouth are four projections or pins 12, 13, 14 and 15, the pins 12 and 13 being diametrically opposite to the pins 14 and 15 respectively. Fitting rotatably in the cup 11 is another cup 16, on the outer periphery of which are formed slots or grooves 17 and 18, adapted to receive slidably the pins 12, 13, 14 and 15, while on the inside of the cup 16 are formed four projections 21, 22, 23 and 24 similar to the pins of cup 11, the pins 21 and 22 being positioned diametrically opposite to the pins 23 and 24 respectively and the radial positions of these pins being intermediate the positions of the grooves 17 and 18, as shown more particularly in Fig. 6.

It should be here pointed out that the pins of the cup 11 are preferably beveled, as shown in Fig. 5, to allow for the movement of the driving pin sleeve, hereinafter described.

25 indicates a ball member fitted rotatably in the cup 16 on the periphery of which ball are provided slots 26 and 27, adapted to receive slidably the pins 21, 22, 23 and 24, while extending from the ball into the slot 8 of the enlargement 4 is a pin 30, called the driving pin, on which is mounted a sleeve 31, preferably of brass, and which sleeve fits slidably the slot 8 and in which sleeve the driving pin 30 is freely rotatable. The end of the pin 30 and sleeve 31 is cut away at an angle of 45° and on the end of the sleeve are formed brackets 32, to which brackets is connected a forked lever 33, the end of which extends beyond the periphery of the enlargement 4 so that there may be connected thereto a yoke 34, which yoke is formed partly semi-circular to extend around one-half of the circumference of the enlargement, its ends being continued straight and fulcrumed on both sides of the enlargement on pins 35 and 36. The ends of the yoke are carried beyond the fulcrum points, and connected to each end respectively are levers 37 and 38, the opposite ends of which levers are suitably connected to a collar 39 slidably mounted on the enlargement 4, and between the collar 39 and the flange 5 already mentioned is disposed a spring 40, as shown in Figs. 1 and 2, which spring is secured at both ends to the collar 39 and flange 5 respectively.

41 indicates a clutch collar, slidably mounted on the driving shaft 1, which collar may be moved in either direction by any well known clutch collar actuating device (not shown) and is connected to the collar 39 by means of suitable bolts 42 from which it will be seen that the collar 39 may be moved also in either direction by the corresponding movement of the clutch collar 41.

43 indicates a recess formed in the bottom of the counter-bore 6, which recess extends into the enlargement 4 a sufficient depth to allow a clearance space for the cup 16 as it moves in any direction during the operation of the device.

The parts of the mechanism are inclosed in an oil tight casing, indicated by the numeral 44, so that the entire device may run in an oil bath during operation.

Having thus indicated the principal parts of the invention its operation will now be described.

Referring particularly to Fig. 2, it will be seen that the driving pin 30 is in the central position, which is the free or neutral position when the driving shaft 1 is in operation, as the pin 30 then rotates freely in the sleeve 31 and axially in the enlargement 4 without moving the driven shaft 3. The forked lever 33, yoke 34, levers 37 and 38, collar 39, and the clutch collar 41 are then in the relative positions shown in Figs. 1 and 2, the spring 40 being then in tension, having been stretched by the act of moving the clutch collar outwardly by the clutch actuating device employed for shifting it when moving the pin 30 to the central position such as a foot pedal in an automobile or a reversing lever and notched sector in a stationary engine or in line shafting, as will be well understood by those skilled in the art. That is to say, when the pin 30 is neutral and the respective operating elements are in the position shown in Fig. 1, the spring 40 is in tension and is held so as long as the clutch actuating device is maintained in neutral position. When the clutch actuating device is released, however, the spring 40 then compresses, drawing collar 39 and levers 37 and 38 backwardly to swing the yoke 34, lever 33, and pin 30 with its sleeve 31 to the extreme out position, as indicated by the dotted lines in Fig. 2, when the pin 30 and sleeve 31 will be in engagement with the slot 8 of the enlargement, or in position to drive shaft 3, the movement being assisted by pushing the collar 41 backwardly. The speed at which the pin 30 moves when returning to center is determined by the strength of spring 40.

It will be apparent that these movements, that is, the moving of the pin 30 from the neutral to the driving position, or vice versa, is easily effected, and that when either driving or running free, the operation is smooth and flexible, as it will be seen that the connection between the driving and driven shafts is in effect a ball-and-socket connection, in which the respective moving parts are practically floating, as it were, one within the other and each capable of assuming any angular position with great freedom so that the wear and tear due to friction is reduced to the minimum.

It should be here stated that, although only one inner cup 16 is shown, there may be more than one such cup employed, each fitting within the other; the illustration, however, shows the practical application of the invention in a simple form.

As changes could be made in the foregoing construction, and different embodiments of the invention, within the scope of the claims, constructed without departing from the spirit thereof, it is intended that all matter contained in the accompanying specification and drawings shall be interpreted as illustrative and not in a limiting sense.

What I claim as my invention is:—

1. In transmission mechanism, a driving shaft provided with a center pin extension swingable in any direction about its axis, and a driven shaft having a recess in which said pin fits so as to rotate free of said driven shaft when centered or to drive said shaft when moved out of center.

2. In transmission mechanism, the combination with a power shaft and a driven shaft, of a ball-and-socket member between said shafts adapted to rotatably connect said shafts together, an axial extension on said member and mechanism for moving said extension.

3. In transmission mechanism, the combination with a power shaft, of a driven shaft having a longitudinal axially arranged recess extended radially through the shaft as a slot, a ball-and-socket member rotatable with the driving shaft having an axial extension rotatable in the said axial recess, and means for moving said extension from its axial position to an angular position in said slot.

4. In transmission mechanism, the combination with a power shaft, of a driven shaft having a longitudinal axially arranged recess extended radially through the shaft as a slot, a ball-and-socket member rotatable with the driving shaft having an axial extension rotatable in the said axial recess, and means for moving said extension from its axial position to an angular position in said slot, said means being adapted to return said extension to its axial position.

5. In transmission mechanism, the combination with a power shaft, of a driven shaft having a longitudinal axially arranged recess extended radially through the shaft as a slot, a sleeve slidably fitting said axial recess, a ball-and-socket member rotatable with the driving shaft having an axial extension rotatable in the bore of the said sleeve, and means for moving said sleeve to swing said extension out of its axial position or to return it thereto.

6. In transmission mechanism, the combination with a power shaft, of a driven shaft having a longitudinal axially arranged recess extended radially through the shaft as a slot, a ball-and-socket member rotatable with said driving shaft having an axial extension rotatable in said recess and slidable in said slot, a spring mounted on said driven shaft and secured at one end thereto, connecting means between the free end of said spring and the said axial extension whereby compression of the spring swings said extension from its axial position and extension of the spring returns it thereto, and means for operating said spring.

7. In transmission mechanism, the combination with a power shaft, of a driven shaft having a longitudinal axially arranged recess extended radially through the shaft as a slot, a ball-and-socket member rotatable with said driving shaft having an axial extension rotatable in said axial recess and slidable in said slot, a collar movable to and fro on said driven shaft, means for moving said collar, and connecting means between said collar and said axial extension whereby movement of the collar swings said extension from its axial position or returns it thereto.

8. In transmission mechanism, the combination with a power shaft, of a driven shaft having a longitudinal axially arranged recess extended radially through the shaft as a slot, said shaft being provided with an integral flange, a ball-and-socket member rotatable with said driving shaft having an axial extension rotatable in said axial recess and slidable in said slot, a collar movable to and fro on said driven shaft, means for moving said collar, lever connecting means between said collar and said axial extension whereby movement of the collar swings said extension from its axial position or returns it thereto, and a spring disposed between and secured at both ends respectively to the said collar and said flange.

9. In transmission mechanism, the combination with a power shaft, of a driven shaft having a longitudinal axially arranged recess extended radially through the shaft as a slot, a sleeve fitting slidably the said recess and slot, a ball-and-socket member rotatable with the driving shaft the ball of which is provided with an axial extension fitting rotatably the bore of said sleeve, a lever having one end swingably connected to said sleeve and its free end projecting through said slot, a yoke member connected to the free end of the said lever and fulcrumed on the driven shaft, a collar movable to and fro on the driven shaft, a lever connection between said collar and said yoke, and means for operating said collar.

10. In transmission mechanism, the combination with a power shaft, of a driven shaft enlarged at the end adjacent the driving shaft, said enlargement being counterbored and provided with a longitudinal recess axially arranged and extended radially through the enlargement as a slot, a coupling member secured to the power shaft and rotatably fitting the counterbore of the driven shaft, said coupling member being provided with a cup shaped recess in its free end, a ball fitting the said cup in driving engagement therewith and adapted to roll freely therein, said ball being provided with an axial extension rotatable in said axial recess and slidable in said slot, and means for moving said extension from its axial position or for returning it thereto.

11. In transmission mechanism, the combination with a power shaft, of a driven shaft enlarged at the end adjacent the power shaft, said enlargement being counterbored and provided with a longitudinal recess axially arranged and extended radially through the enlargement as a slot, a coupling member secured to the power shaft and rotatably fitting the counterbore of the driven shaft, said coupling member being provided with a cup shaped recess in its free end, a cup shaped member fitting said cup shaped recess in driving engagement therewith and adapted to roll freely therein, a ball fitting said member also in driving engagement therewith and adapted to roll freely therein, said ball being provided with an axial extension rotatable in said axial recess and slidable in said slot, and means for moving said extension from its axial position or for returning it thereto.

12. In transmission mechanism, the combination with a power shaft, of a driven shaft enlarged at the end adjacent the power shaft, said enlargement being provided with a counterbore and provided with a longitudinal recess axially arranged and extended radially through the enlargement as a slot, a coupling member secured to the power shaft and rotatably fitting the counterbore of the driven shaft, said coupling member being provided with a cup shaped recess in its free end on the inner periphery of which recess adjacent its mouth are diametrically opposite projections, a cup shaped member rotatably fitting said cup shaped recess having on its outer periphery slots in which said projections are slidably engaged and on its inner periphery adjacent its mouth diametrically opposite projections, a ball rotatably fitting said cup shaped member having on its outer periphery slots in which the projections of the member are slidably engaged, said ball being provided with an axial extension rotatable in said axial recess and slidable in said slot, and means for moving said extension from its axial position or for returning it thereto.

13. In transmission mechanism, the combination with a power shaft, of a driven shaft enlarged at the end adjacent the power shaft, said enlargement being provided with a counterbore the bottom of which is reduced in diameter to form a clearance space and having a longitudinal recess axially arranged and extended radially through the enlargement as a slot, a coupling member secured to the power shaft and rotatably fitting the counterbore of the driven shaft, said coupling member being provided with a cup shaped recess in its free end on the inner periphery of which adjacent its mouth are diametrically opposite projections the outer ends of which are beveled, a cup shaped member rotatably fitting said cup shaped recess and movable into said clearance space as it is rotated having on its outer periphery slots in which said projections are slidably engaged and on its inner periphery adjacent its mouth diametrically opposite projections, a ball rotatably fitting said cup shaped member having on its outer periphery slots in which the projections of the cup shaped member are slidably engaged, said ball being provided with an axial extension and a squared sleeve in the bore of which the said extension is rotatable, said sleeve fitting said axial recess and being slidable in said slot, and means for moving said sleeve to swing said extension out of its axial position or to return it thereto.

Dated at Vancouver, B. C., this 9th day of January, 1918.

FRANCIS LEE RANDALL.

Copies of this patent may be obtained for five cents each, by addressing the "Commissioner of Patents, Washington, D. C."